United States Patent
Smiltneek et al.

(10) Patent No.: US 8,657,268 B2
(45) Date of Patent: Feb. 25, 2014

(54) METHODS AND APPARATUS FOR WASTEWATER TREATMENT

(76) Inventors: Gregory P. Smiltneek, Menomonee Falls, WI (US); Martin M. Smiltneek, Oconomowoc, WI (US); Robert B. Wheeler, Greenfield, WI (US); David T. Redmon, Racine, WI (US); Thomas E. Frankel, Poughkeepsie, NY (US); Arthur W. Phenicie, Hartland, WI (US); Mark T. Raether, Oconomowoc, WI (US)

( * ) Notice: Subject to any disclaimer, the term of this patent is extended or adjusted under 35 U.S.C. 154(b) by 628 days.

(21) Appl. No.: 13/026,221

(22) Filed: Feb. 12, 2011

(65) Prior Publication Data

US 2011/0132847 A1 Jun. 9, 2011

Related U.S. Application Data

(63) Continuation-in-part of application No. 11/712,268, filed on Feb. 28, 2007, now Pat. No. 8,020,839.

(51) Int. Cl.
*B01F 3/04* (2006.01)
*C02F 3/20* (2006.01)
*C02F 1/74* (2006.01)

(52) U.S. Cl.
CPC ............. *B01F 3/04241* (2013.01); *C02F 3/201* (2013.01); *B01F 2003/04177* (2013.01); *B01F 2003/04276* (2013.01); *C02F 1/74* (2013.01); *Y10S 261/70* (2013.01)
USPC .................. 261/122.1; 261/DIG. 70; 210/758

(58) Field of Classification Search
CPC ............... B01F 3/0412; B01F 3/04241; B01F 3/04262; B01F 2003/0412; B01F 2003/0417; B01F 2003/04177; B01F 2003/04148; B01F 2003/04234; B01F 2003/04276; B01F 2003/04297; C02F 1/727; C02F 1/74; C02F 1/78; C02F 3/20; C02F 3/201
USPC .............. 261/122.1, 122.2, DIG. 70; 210/758
See application file for complete search history.

(56) References Cited

U.S. PATENT DOCUMENTS

| | | | | |
|---|---|---|---|---|
| 4,007,240 A | * | 2/1977 | Gosden | 261/122.1 |
| 4,488,508 A | * | 12/1984 | Heideman | 119/215 |
| 5,204,028 A | * | 4/1993 | Ruston | 261/122.1 |
| 5,330,688 A | * | 7/1994 | Downs | 261/122.2 |
| 5,676,890 A | * | 10/1997 | Ott | 261/122.2 |
| 5,863,031 A | * | 1/1999 | Veeder et al. | 261/122.1 |
| 6,811,148 B2 | * | 11/2004 | Frankel et al. | 261/122.1 |
| 7,311,299 B2 | * | 12/2007 | Sasajima | 261/122.1 |
| 8,020,839 B2 | * | 9/2011 | Smiltneek et al. | 261/122.1 |
| 8,061,689 B2 | * | 11/2011 | Tharp | 261/122.1 |
| 8,505,882 B2 | * | 8/2013 | Sakai et al. | 261/28 |
| 2002/0033544 A1 | * | 3/2002 | Jager | 261/122.1 |
| 2006/0226260 A1 | * | 10/2006 | Jager | 239/398 |

* cited by examiner

*Primary Examiner* — Charles Bushey
(74) *Attorney, Agent, or Firm* — Law Offices of Michael L. Wise, LLC

(57) ABSTRACT

Wastewater is treated by providing a distribution conduit and providing a diffuser assembly. An aperture is created in the distribution conduit having an initial minimum diameter. The diffuser assembly, in turn, comprises a diffuser membrane in fluidic communication with a mating tube. The mating tube has an initial outside diameter at a location along its length greater than the initial minimum inside diameter of the aperture. The mating tube is inserted into the aperture until the location on the mating tube that, before insertion, had the initial outside diameter is encircled by the aperture where the aperture, before insertion, had the initial minimum inside diameter. This forms an airtight interference fit between the distribution conduit and diffuser assembly.

25 Claims, 8 Drawing Sheets

METHODS AND APPARATUS FOR WASTEWATER TREATMENT

FIELD OF THE INVENTION

The present invention relates generally to equipment for wastewater treatment, and, more particularly, to fine bubble diffuser assemblies for use in wastewater treatment.

BACKGROUND OF THE INVENTION

Biological treatment of wastewater or sewage is known and has been used for some time to remove solids and clarify the wastewater for reuse or for safer disposal. A number of different system configurations are possible. In one configuration, the wastewater is in a tank, and at the top or bottom of the tank is a mechanism for dispersing a fluid into the wastewater. The term "fluid" as used herein, is intended to include a substance, such as a liquid or gas, that is capable of flowing and that changes its shape at a steady rate when acted upon by a force tending to change its shape. The dispersed fluid used in wastewater treatment is most commonly air.

The fluid dispersion mechanism at or near the bottom of the tank typically effects an upward movement of the wastewater in the tank. This movement or rolling of the wastewater is important to keeping the suspended solids in suspension and is essential to effect the needed mixing of the tank contents for the biological process which is carried out in the tank. The use of a dispersed fluid, such as air, is intended to supply the microorganisms of the biological process with the required dissolved oxygen. For that purpose, the air is diffused or discharged as bubbles of a predetermined size to provide the maximum possible air-water interface area per volume of air. The partial pressures of the free and dissolved oxygen then determine the rate of transfer of oxygen from the air to the water. The length of time the bubbles remain in the liquid is in part a function of the efficiency of the tank.

Known systems include a number of different configurations for dispersing a fluid into wastewater. Some configurations include a mechanism positioned within the wastewater (e.g., submerged), and other configurations include a mechanism positioned on top of the wastewater (e.g., rotating contactor). These systems are generally complicated assemblies that require extensive time and effort to manufacture, transport, and install.

FIG. 1 shows a side perspective view of a partially cutaway fine bubble diffuser assembly 100 that is conventionally used in modern wastewater treatment facilities for "submerged" treatment of the wastewater. Wastewater treatment with such assemblies is described in, as just one example, F. L. Burton, *Wastewater Engineering* (McGraw-Hill College, 2002), which is hereby incorporated by reference herein. When in use, a plurality of diffuser assemblies is arrayed on several lateral distribution conduits that cross a wastewater treatment tank. Diffuser assemblies may, for example, be placed every foot along a given lateral distribution conduit. A blower located near the tank sends compressed air to the lateral distribution conduits via several support distribution conduits (e.g., drop distribution conduits and manifold distribution conduits). In the diffuser assembly 100, a flexible diffuser membrane 110 sits atop a diffuser body 120. In this case, the flexible diffuser membrane 110 comprises a disc-shaped membrane that is constructed of rubber or other similar materials, which is punctured to provide a number of perforations in the form of holes or slits. The diffuser body 120 itself comprises a threaded connector 130, an air inlet orifice 140, and a receiving surface 150 for coupling to a retainer ring 160.

The retainer ring 160 holds the flexible diffuser membrane 110 against the diffuser body 120. When gas is applied to the flexible diffuser membrane 110 through the air inlet orifice 140, the gas pressure expands the flexible diffuser membrane 110 away from the diffuser body 120 and causes the membrane's perforations to open so that the gas discharges through them in the form of fine bubbles. When the gas pressure is relieved, the flexible diffuser membrane 110 collapses on the diffuser body 120 to close the perforations and prevent the liquid from entering the diffuser body 120 in the opposite direction. Generally, a flexible diffuser membrane 110 configured in this way produces bubbles smaller than five millimeters in diameter. The resultant large ratio of surface area to volume in these bubbles promotes efficient oxygen mass transfer between the bubbles and the surrounding wastewater. The fine bubbles also cause an upward movement in the wastewater tank, which helps to keep solid waste in suspension and to mix the contents of the tank.

A typical wastewater treatment tank may include 2,000 diffuser assemblies and their associated distribution conduits. Because of this large number, the ease in which the diffuser assemblies are mounted (i.e., mated) to the distribution conduits becomes a large factor in determining labor needs and, ultimately, installation costs. One such mounting method, for example, comprises the use of a clam-shell device or saddle that encircles the distribution conduit and provides a mounting point for the diffuser assembly. FIG. 2 shows such a saddle 200 on a distribution conduit 210 with a diffuser assembly 220. To install the diffuser assembly 220, a hole is first drilled in the distribution conduit 210 where the diffuser assembly 220 is to be placed, and then the saddle 200 is encircled about the distribution conduit 210 at this point and tightened thereto by hammering in a wedge 230. The diffuser assembly 220 is then attached to the top of the saddle 200. Water tight seals are ensured using two internal rubber o-rings (not shown). Another mounting method comprises the solvent welding of a plastic diffuser base to a plastic distribution conduit. The diffuser base and distribution conduit may, for instance, be formed of polyvinylchloride. A bead of resin around the solvent weld further ensures a watertight seal.

Nevertheless, while generally effective over the medium term when installed under ideal temperatures (e.g., above 30 degrees Fahrenheit) by a skilled foreman with a crew of semi-skilled workers, mounting diffuser assemblies in these manners is labor intensive and not conducive to using machines rather than humans to perform the mounting task. With respect to saddles, for example, there are too many parts for automation to be effective. Moreover, assembling plastic components together under sub freezing conditions often results in failure because plastic components contract and become brittle at low temperature. Accordingly, assembly is often delayed by the need to wait for a warm day or the need to soak the plastic components in warm water prior to assembly. With respect to solvent welding, the time required for a solvent weld and resin to cure renders automation of the attachment of the diffuser base to the distribution conduit prohibitively slow. Furthermore, the solvent weakens the joint, and, over the medium term, pipes have a tendency to crack and fail where solvent has been applied. Finally both examples of existing systems require a skilled foreman and a semi-skilled crew, which are costly and are not always available (e.g., in a National Parks or in a U.S. Island Territory).

Accordingly, it is desirable to obtain other means of mounting fine bubble diffuser assemblies to distribution conduits that utilize fewer parts and are less labor intensive than prior art means, but also provide the same level or a higher level of reliability in use. Ideally such other means will further lend themselves to the automation of the mounting process and the use of the same diffuser assembly for distribution conduits of varying shapes and dimensions.

SUMMARY OF THE INVENTION

Embodiments of the present invention address the above-identified needs by providing methods and apparatus for use in the treatment of wastewater.

In accordance with aspects of the invention, wastewater is treated by providing a distribution conduit and providing a diffuser assembly. An aperture is created in the distribution conduit having an initial minimum inside diameter. The diffuser assembly, in turn, comprises a diffuser membrane in fluidic communication with a mating tube. The mating tube has an initial outside diameter at a location along its length greater than the initial minimum inside diameter of the aperture. The mating tube is inserted into the aperture until the location on the mating tube that, before insertion, had the initial outside diameter is encircled by the aperture where the aperture, before insertion, had the initial minimum inside diameter. This forms an airtight interference fit between the distribution conduit and diffuser assembly.

In accordance with one of the above-identified embodiments of the invention, a diffuser assembly comprises a mating tube for insertion into an aperture in a distribution conduit. The diameter of the mating tube is slightly larger than the diameter of the aperture, and the mating tube comprises a material that is slightly softer than the material forming the distribution conduit. Forceful insertion of the mating tube into the aperture forms an airtight interference fit between the two components. Moreover, the diffuser assembly also comprises an anti-torque projection that projects from its lower surface and includes a peripheral edge with portions that match the outside contour of the distribution conduit. Insertion of the mating tube into the aperture so that these portions of the anti-torque projection contact the distribution conduit helps to stabilize the final combination by restricting any twisting motion that might act to compromise the interference fit and result in a leak.

Advantageously, embodiments such as this provide means of mating diffuser assemblies to distribution conduits that utilize fewer parts and are less labor intensive than prior art means, but also provide the same level or a higher level of reliability in use. Furthermore, such embodiments lend themselves to the automation of the mounting process as well as the use of the same diffuser assembly design for distribution conduits of varying shapes and dimensions.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention describes methods and apparatus allowing diffuser assemblies to be attached to distribution conduits in a manner that provides several advantages over the prior art. These methods and apparatus will be described with respect to illustrative embodiments. Nevertheless, because of the illustrative nature of these embodiments, numerous modifications can be made to these embodiments and the results may still come within the scope of the invention. No limitations with respect to the specific embodiments described herein are intended or should be inferred.

More specifically, the two illustrative embodiments described herein will each set forth various aspects of the invention that may, ultimately, be mixed and matched to address real-world applications. The first illustrative embodiment will describe diffuser assemblies with straight-walled mating tubes and pairs of anti-torque projections, and the manner in which these particular diffuser assemblies may be mated with distribution conduits having apertures with inwardly slanting edges. Next, the second illustrative embodiment will describe diffuser assemblies having necked-down mating tubes and a "universal" anti-torque projection in combination with distribution conduits having straight-walled apertures. Lastly, the manner in which the features described in the first and second embodiments may be mixed and matched to address different real-world wastewater treatment applications, as well as the several advantages of aspects of the invention over the prior art solutions, will be discussed.

I. First Illustrative Embodiment

Figure 3:
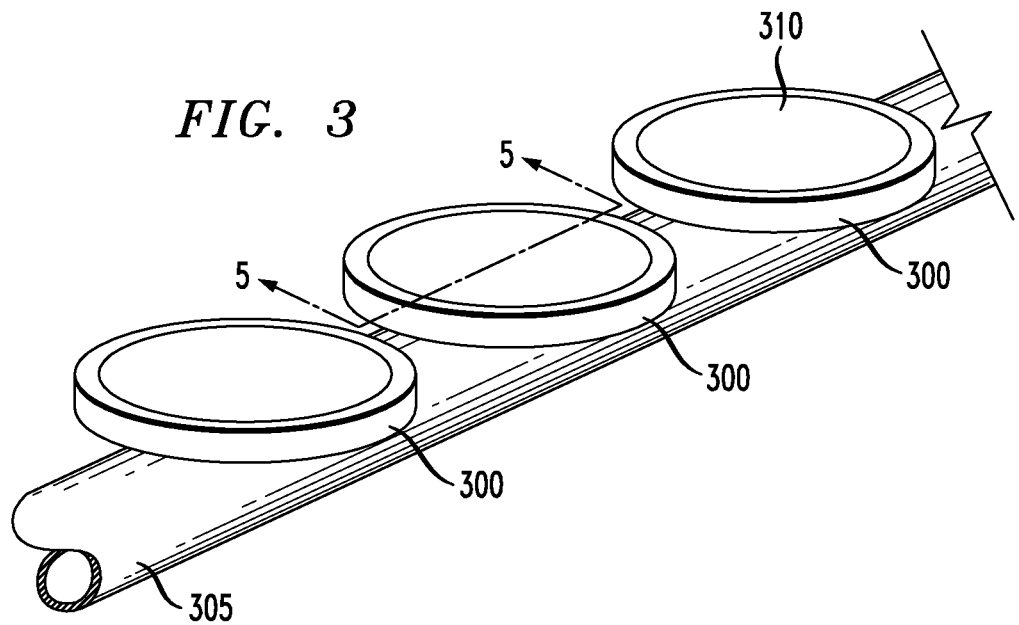
FIG. 3 shows a side perspective view of three diffuser assemblies mated to a distribution conduit in accordance with a first illustrative embodiment of the invention.
Figure 4:
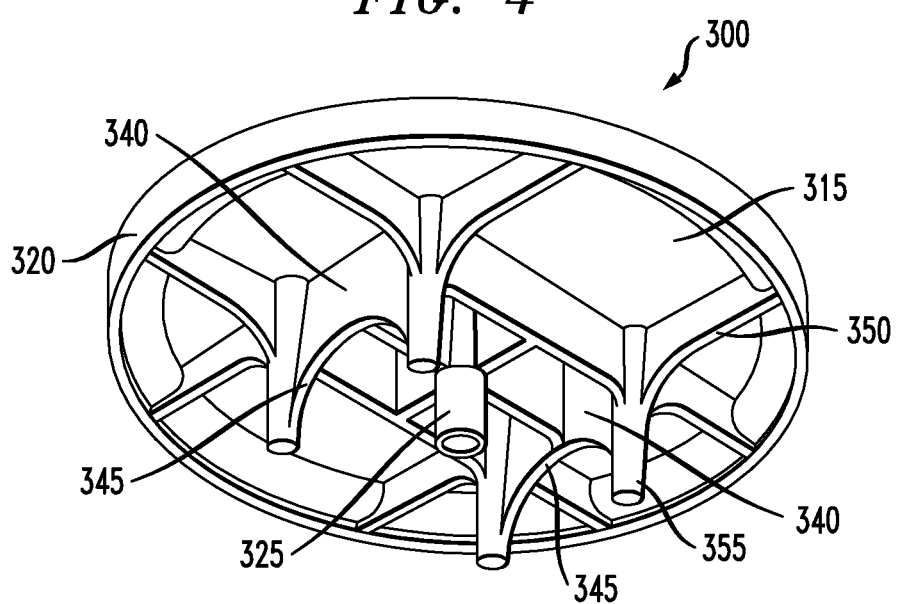
FIG. 4 shows a bottom perspective view of one of the FIG. 3 diffuser assemblies.

FIG. 3 shows a side perspective view of three substantially identical diffuser assemblies 300 attached to a distribution conduit 305 using methods and apparatus in accordance with a first illustrative embodiment of the invention. FIG. 4, in turn, shows a bottom perspective view of a representative one of the diffuser assemblies 300 before being mated to the distribution conduit 305. As shown in these figures, the representative diffuser assembly 300 is substantially round in plan view, although other shapes, such as oval, square, rectangular, polygonal, and irregular, may also be used with the present invention. The distribution conduit 305, in turn, comprises a substantially circular cylinder (e.g., a round pipe), but other shapes (e.g., square pipes and rectangular pipes) are equally applicable to the methods and apparatus described and claimed herein. As is typical in real world applications, the diffuser assemblies 300 are arranged at equal spacings along the distribution conduit 305. A 20 foot long distribution conduit in a region of a wastewater treatment tank requiring a lot of aeration and mixing might, for example, support 19 diffuser assemblies having nine inch diameter flexible diffuser membranes.

Figure 1:
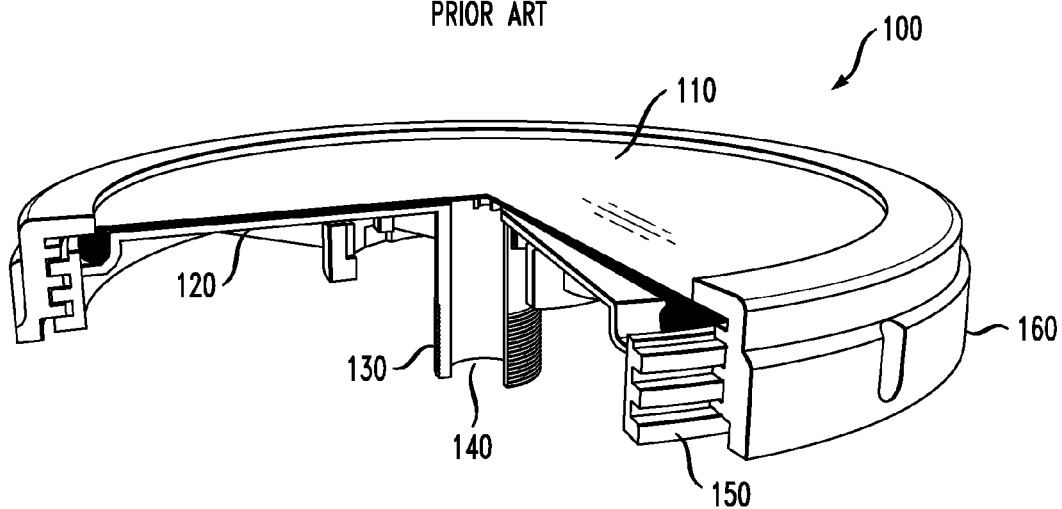
FIG. 1 shows a side perspective view of a diffuser assembly in accordance with the prior art.
Figure 2:
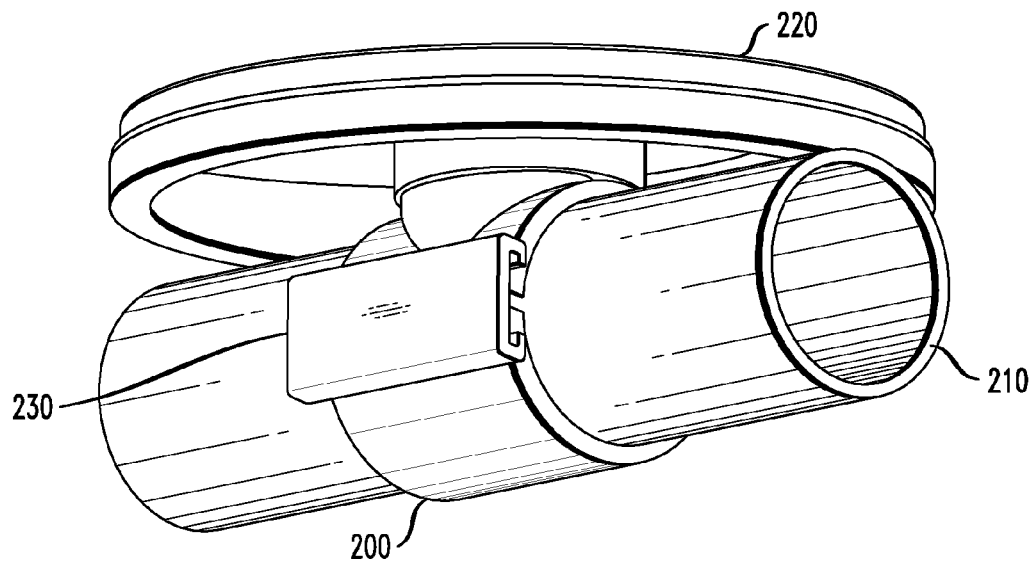
FIG. 2 shows a side perspective view of a diffuser assembly attached to a conduit using a saddle in accordance with the prior art.

As was the case in FIG. 1, the diffuser assembly 300 comprises a flexible diffuser membrane 310 mounted on a diffuser body 315. The diffuser body 315 comprises a receiving surface and removable retainer ring 320 much in the same manner as the diffuser assembly 100. However, instead of having a threaded connector to define an air inlet orifice, the diffuser assembly 300 utilizes a mating tube 325. This mating tube 325 describes a cylinder with substantially straight sidewalls and without threads. The air inlet formed by the mating tube 325 is in fluidic communication with the bottom or "air-side" of the flexible diffuser membrane 310, allowing the flexible diffuser membrane 310 to expand and produce a plume of bubbles when compressed air is transported through the mating tube 325.

Figure 5A:
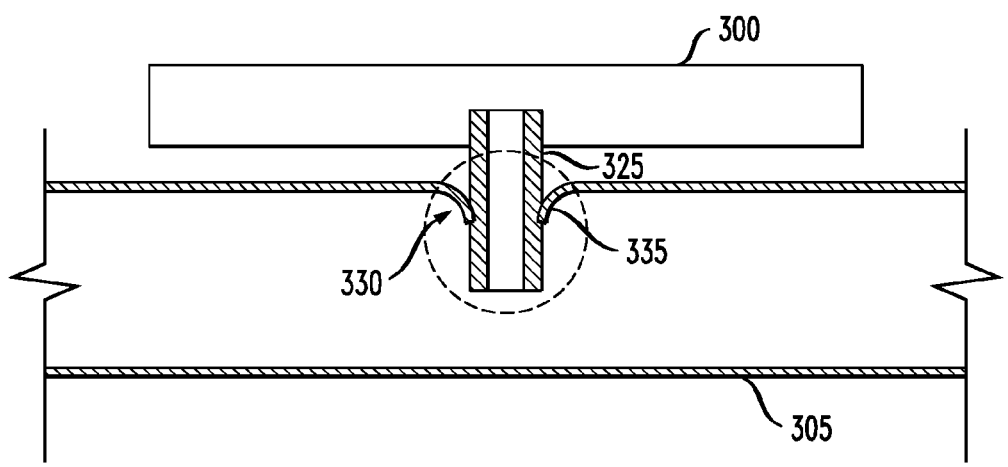
FIGS. 5A and 5B show sectional views of one of the FIG. 3 diffuser assemblies mounted to the distribution conduit.
Figure 5B:
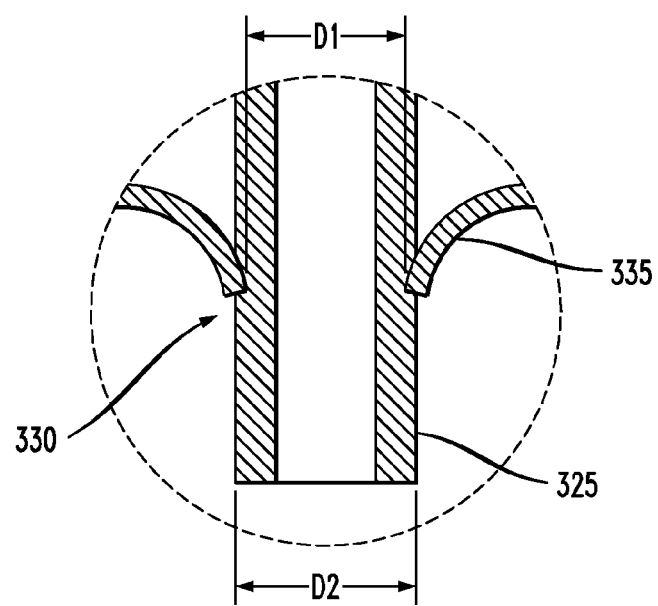

To illustrate how the diffuser assembly 300 is mated to the distribution conduit 305, FIGS. 5A and 5B show sectional views of the coupled diffuser assembly 300 and distribution conduit 305 cut along the plane indicated in FIG. 3. Initially an aperture 330 is made in the wall of the distribution conduit 305. Desirably, the aperture 330 includes an inwardly slanting edge 335. The inwardly slanting edge 335 can be a straight edge, or can be somewhat arcuate, as shown (either inward or outward). As used in this disclosure, the term "slant" (and derivatives) is intended to mean to veer or angle away from a given level or line, such as a horizontal, and/or to have a slope. In this manner, the aperture 330 has an initial minimum inside diameter, D1, at a point on the aperture 330 proximate to a distal end of its inwardly slanting edge 335 before the mating tube 325 is inserted therein. The term "initial" is used in association with this diameter, as well as in association with other diameters hereafter, to indicate that the respective dimension is that which exists before, rather than after, mating the diffuser assembly 300 to the distribution conduit 305.

The mating tube 325, in contrast, has an initial outside diameter, D2, also indicated in FIG. 5B. This initial outside diameter is greater than the initial minimum inside diameter of the aperture 330 (i.e., D2>D1). Dimensional differences may, as just an example, be about 0.1 inches, although any equally suitable difference may be chosen. Mating the diffuser assembly 300 with the distribution conduit 305 then merely requires forcefully inserting the mating tube 325 into the aperture 330 until a location on the mating tube 325 that, before insertion, had the initial outside diameter, D2, is encircled by the aperture 330 where the aperture 330, before insertion, had the initial minimum inside diameter, D1. The insertion step is preferably performed within a temperature range of 50 to 150 degrees Fahrenheit. Driving the mating tube 325 into the aperture 330 in this manner causes the slanting edge to bite into and/or compress the mating tube 325 to form an airtight interference fit (i.e., friction lock fit) as indicated in the figures.

In one embodiment, the inwardly slanting edge 335 extends more than a wall thickness of the distribution conduit 305 into the distribution conduit 305. Advantageously, the recessed top of the slanting edge of the aperture 330 acts as a guide for the placement of the mating tube 325 just prior to the application of the insertion force. Testing has shown the interference fit of the aperture 330 and the mating tube 325 arranged in this manner is capable of withstanding air pressures in the distribution conduit 305 of greater than 100 pounds per square inch (psi). This pressure is in excess of what is commonly found in wastewater treatment systems. Notwithstanding this, however, actual pressure tolerances obtained using embodiments in accordance with aspects of the invention are estimated to be substantially greater than even this.

Notably, the airtight interference fit between the mating tube 325 and the distribution conduit 305 is improved by having the distribution conduit 305 be formed of a harder material than the material forming the mating tube 325, thereby allowing the "biting in" or compression described above. In the present embodiment, the distribution conduit 305 might, for example, comprise stainless steel while the mating tube 325 (and possibly the larger diffuser body 315) comprises a polymer material such as polypropylene or polyethylene. This combination of materials is conventionally used in wastewater treatment applications. Aspects of the invention related to material properties are further addressed below.

Again referring to FIG. 4, it will be noted that the diffuser assembly 300 includes two separate anti-torque projections 340. The two anti-torque projections 340 are mirror-images of one another and are arranged on opposite sides of the mating tube 325. Each anti-torque projection 340 defines a respective peripheral edge 345. In accordance with aspects of the invention, these peripheral edges 345 substantially conform to the outside contour of the distribution conduit 305. In the present embodiment, for example, the anti-torque projections 340 form arcuate saddles that generally conform to the exterior shape of the distribution conduit 305. Nevertheless, by extension, were the distribution conduit 305 square or rectangular instead of round, the peripheral edges 345 would each describe conformal shapes thereto, namely ones each having one or more square corners. A plurality of fins 350 also protrude from the bottom of the diffuser assembly 300, and reinforce and stiffen the anti-torque projections 340 as well as the remainder of the diffuser assembly 300.

Figure 6:
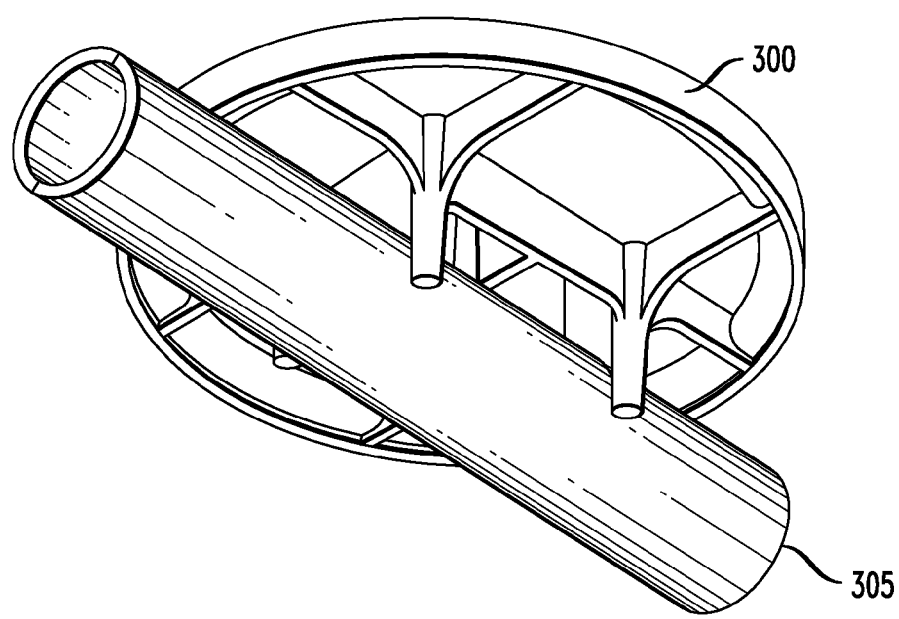
FIG. 6 shows a bottom perspective view of one of the FIG. 3 diffuser assemblies mated to the distribution conduit.

The purpose of the anti-torque projections 340 is to inhibit any twisting of the diffuser assembly 300 relative to the distribution conduit 305 once they are mated. In this manner, the anti-torque projections 340 allow the retainer ring 320 to be unthreaded from, and re-torqued back onto, the remainder of the diffuser assembly 300 so that the flexible diffuser membrane 310 may be replaced in situ without disturbing the watertight seal between the mating tube 325 and the distribution conduit 305. In order to take advantage of the anti-torque projections 340, the mating tube 325 is inserted into the distribution conduit 305 until the anti-torque projections' saddle shaped peripheral edges 345 contact the distribution conduit 305. Such an inserted condition is shown in bottom perspective view in FIG. 6. Any rotation between the diffuser assembly 300 and the distribution conduit 305 is thereby inhibited. Four posts 355 are also present on the bottom of the diffuser assembly 300 and further aid in restricting any kind of upset to the interference fit that could result in a leak.

II. Second Illustrative Embodiment

Having now described the first illustrative embodiment of the invention in reference to FIGS. 3-6, it is now possible to describe a diffuser assembly 400 and distribution conduit 405 combination in accordance with a second illustrative embodiment. This second embodiment is described with reference to FIGS. 7-13.

Figure 7:
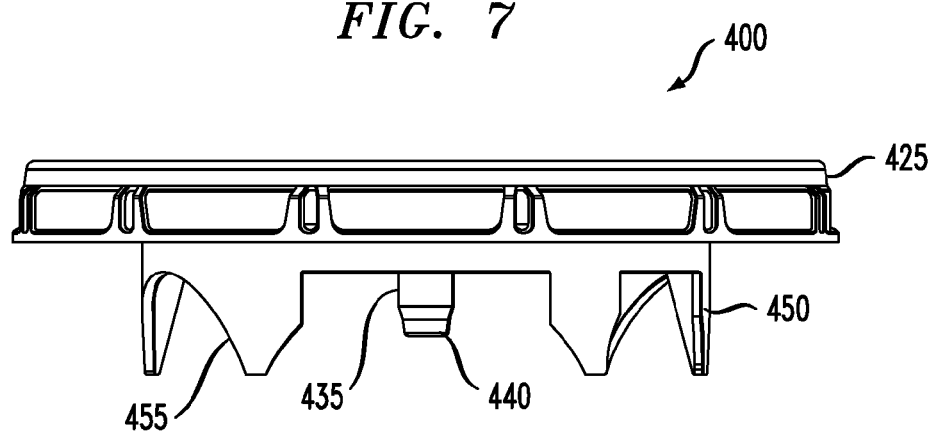
FIG. 7 shows a side perspective view of a diffuser assembly in accordance with a second illustrative embodiment of the invention.
Figure 8:
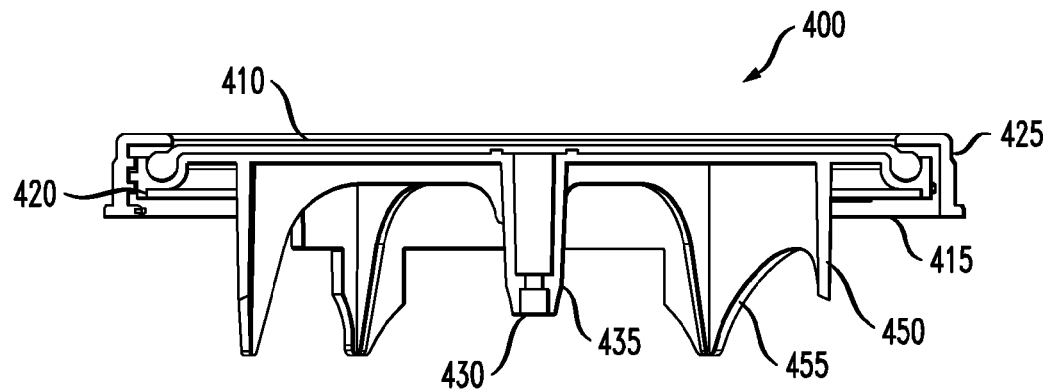
FIG. 8 shows a sectional view of the FIG. 7 diffuser assembly.
Figure 9:
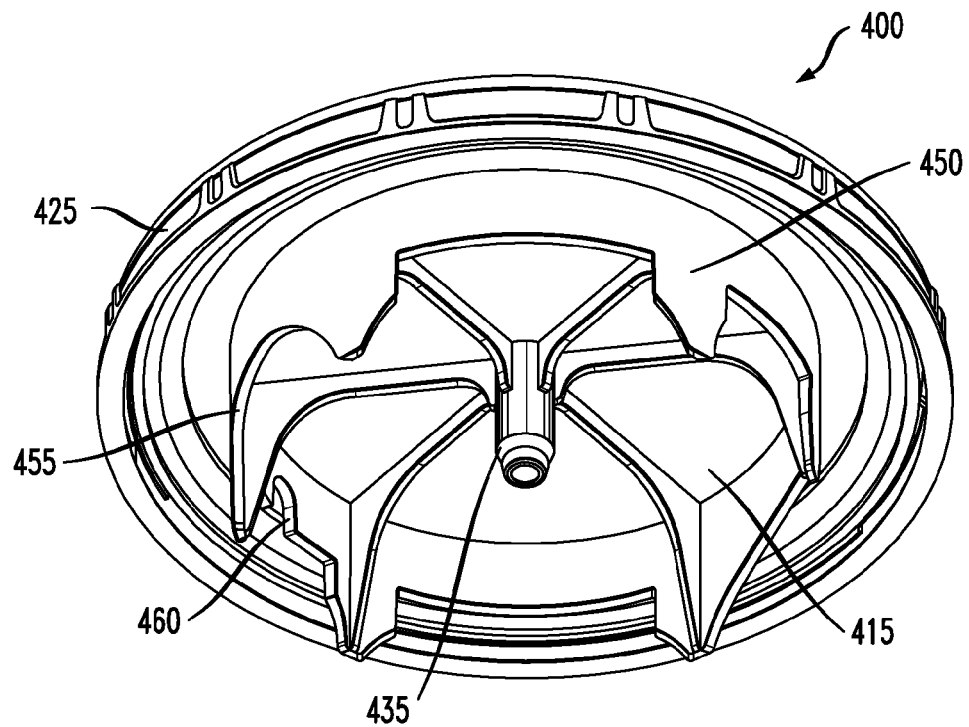
FIG. 9 shows a bottom perspective view of the FIG. 7 diffuser assembly.

FIG. 7 shows a side perspective view of the diffuser assembly 400, while FIG. 8 shows a sectional view along the center of the diffuser assembly 400, and FIG. 9 shows a bottom perspective view. Again like the conventional diffuser assembly 100 described earlier, the diffuser assembly 400 comprises a flexible diffuser membrane 410 that sits atop a diffuser body 415. The diffuser body 415 itself comprises a receiving surface 420 for coupling to a retainer ring 425.

An air inlet orifice 430 is built into a mating tube 435. In this particular embodiment, however, the mating tube 435 is tapered. More precisely, it comprises two straight-walled cylindrical portions that are connected by a tapered-wall cylindrical portion. The distal portion 440 has a substantially smaller outside diameter than the remainder of the mating tube 435.

Figure 10A:
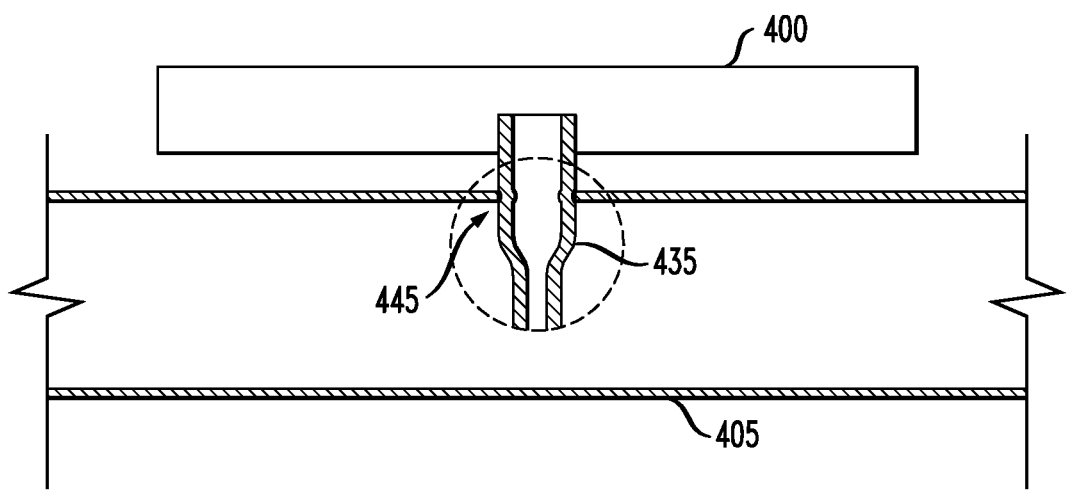
FIGS. 10A and 10B show sectional views of the FIG. 7 diffuser assembly mated to a distribution conduit.
Figure 10B:
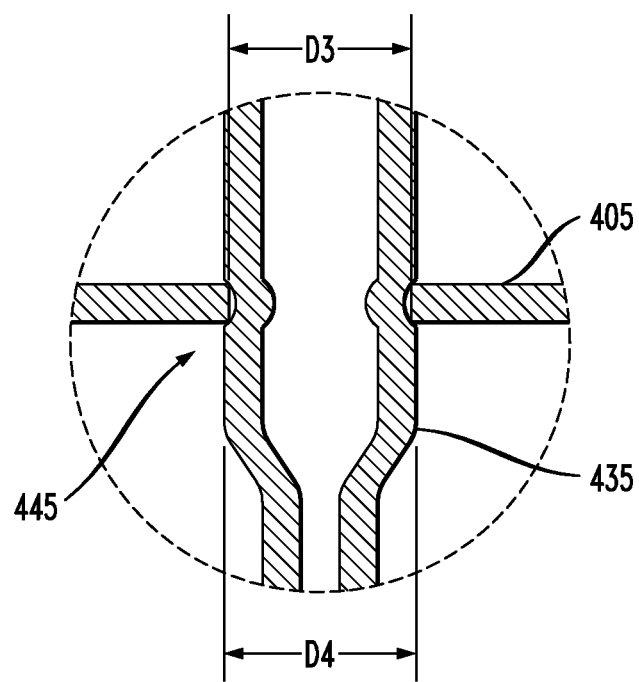

To show how the diffuser assembly 400 is coupled to the distribution conduit 405, FIGS. 10A and 10B show sectional views of both elements cut along the center of the diffuser assembly 400, much in the same manner as FIGS. 5A and 5B. As before, an aperture 445 is formed in the distribution conduit 405 at the location where connection to the diffuser assembly 400 is desired. Nevertheless, unlike the previous embodiment, the aperture 445 is straight-walled (does not contain a slanting edge). The aperture 445 has an initial minimum inside diameter, D3.

The mating tube 435 has an initial outside diameter, D4, which is located in the wider portion of the tapered mating tube 435. In accordance with aspects of the invention, this initial outside diameter is greater than the initial minimum inside diameter of the aperture 445 (i.e., D4>D3). The distal portion 440 of the mating tube 435, in contrast, has a diameter slightly less than the initial minimum diameter of the aperture 445. Mating the diffuser assembly 400 with the distribution conduit 405 then merely requires inserting the distal portion of the mating tube 435 into the aperture 445, and then applying sufficient force to drive the mating tube 435 into the aperture 445 until a location on the mating tube 435 that, before insertion, had the initial outside diameter, D4, is encircled by the aperture 445 where the aperture 445, before insertion, had the initial minimum inside diameter, D3. Advantageously, the narrower distal portion 440 of the mating tube 435 acts as a guide for the initial insertion and holds the mating tube 435 in a position where force can be applied to drive it the remainder of the way without having it slip off of the aperture 445. The insertion step is preferably performed within a temperature range of 50 to 150 degrees Fahrenheit. Driving the mating tube 435 into the aperture 445 in this manner causes the edge of the aperture 445 to bite into and/or compress the mating tube 435 to form an airtight interference fit, as indicated in the figures. Here too, testing has shown the interference fit of the aperture 445 and mating tube 435 arranged in this manner is capable of withstanding air pressures in the distribution conduit of greater than 100 psi.

As was the case in the first embodiment, the airtight interference fit between the mating tube 435 and the distribution conduit 405 is improved by having the distribution conduit 405 be formed of a harder material than the material forming the mating tube 435, thereby allowing the "biting in" or compression described above. In the present embodiment, the distribution conduit 405 might, for example, comprise stainless steel or polyvinylchloride, while the mating tube 435 (and possibly the entire diffuser body 415) comprises polypropylene or polyethylene. Again, these materials are commonly used in wastewater treatment applications. If, on the other hand, the mating tube 435 were formed of a material harder than that forming the aperture, it is foreseen that the interference fit might not be as strong and might loosen over time. This condition might ultimately result in leaks.

Figure 11:
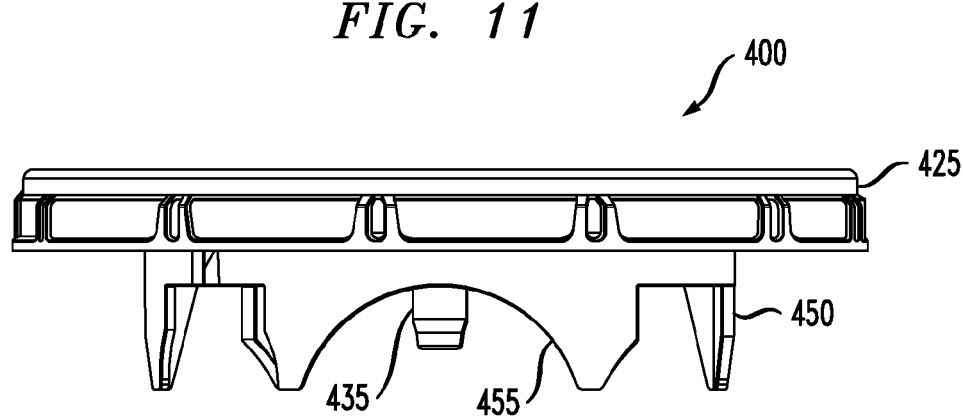
FIGS. 11 and 12 show two more side perspective views of the FIG. 7 diffuser assembly.
Figure 12:
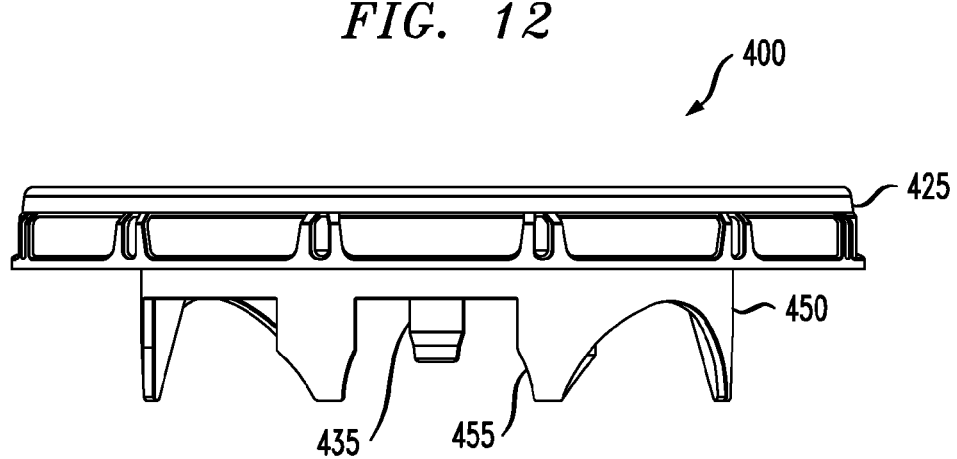
Figure 13:
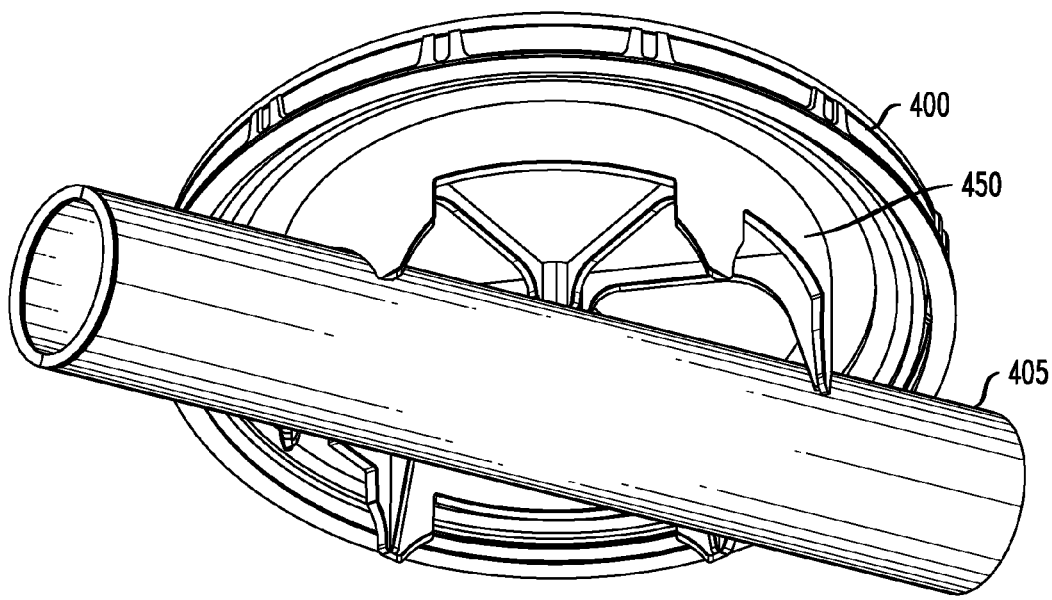
FIG. 13 shows a bottom perspective view of the FIG. 7 diffuser assembly mounted to the distribution conduit.

FIGS. 11 and 12 show additional side views of the diffuser assembly 400. These figures, in combination with FIGS. 7-9, indicate that the diffuser assembly 400, too, includes an anti-torque projection 450 that projects from a bottom surface of the diffuser assembly 400, although this latter projection is substantially different in appearance from the pair of anti-torque projections 340 described earlier.

It will be observed that the anti-torque projection 450 encircles the mating tube 435 and defines a peripheral edge 455 that forms several cutouts. Cutouts on opposing sides of the mating tube 435 are substantially mirror-images of one another. This anti-torque projection 450, although clearly different in appearance, performs substantially the same function as the pair of anti-torque projections 340 in FIG. 4. Portions of the peripheral edge 455 conform to the outside contour of the distribution conduit 405, in this example, a round pipe. The mating tube 435 is inserted into the distribution conduit 405 until these portions contact the distribution conduit 405. Such an inserted condition is shown in bottom perspective view in FIG. 13. As before, any rotation between the diffuser assembly 400 and the distribution conduit 405 is thereby inhibited.

But, while the pair of anti-torque projections 340 on the diffuser assembly 300 was adapted to fit a particular shape and dimension of distribution conduit, the anti-torque projection 450 on the diffuser assembly 400 has the major advantage of allowing the latter diffuser assembly 400 to be mounted on a plurality of distribution conduits with differing outside contours. It will be observed, for example, that several of the cutouts describe shapes having both square edges and arcuate features. Advantageously, these complex shapes have portions that conform to both square pipes as well as round pipes.

In this manner, the diffuser assembly 400 becomes "universal" to several different distribution conduits with differing outside contours. As shown, the diffuser assembly 400 in FIGS. 7-9, 11, and 12 can be mounted on square pipes with dimensions of 2×2 inches and 80×80 millimeters, as well as on round pipes with diameters of 2 inches, 4 inches, and 90 millimeters. The complex anti-torque projection 450 thereby allows the single diffuser assembly 400 to be mounted on all five of the most common distribution conduits utilized both in the United States and abroad. The need to design and produce different diffuser assemblies for each application is thereby vastly mitigated.

III. Mixing and Matching of Features

The above-described embodiments include several features that can be mixed and matched to adapt to several real-world wastewater treatment applications. The first embodiment, for example, utilizes a straight-walled mating tube and an aperture with a slanting edge. The second embodiment, in contrast, utilizes a tapered mating tube and an aperture with a straight-walled edge. In both embodiments, it is desirable that the material forming the aperture is harder than the material forming the mating tube. Depending on the materials used, the mating tube may be formed of a material that is naturally softer than that forming the distribution conduit, or the mating tube may be physically or chemically altered so it is somewhat softer than the distribution conduit.

Table 1 shows four exemplary configurations that utilize common materials in wastewater treatment.

TABLE 1

EXEMPLARY CONFIGURATIONS

| Configuration | Diffuser Assembly Mating Tube | | Distribution Conduit Aperture | |
| --- | --- | --- | --- | --- |
| | Material | Shape | Material | Shape |
| A | PP or PE | Straight | SS | Slanting edge |
| B | PP or PE | Tapered | SS | Slanting edge |
| C | PP or PE | Tapered | SS | Straight Edge |
| D | PP or PE | Tapered | PVC | Straight Edge |

SS = Stainless steel;
PP = Polypropylene;
PE = Polyethylene; and
PVC = Polyvinylchloride In formulating this Table, it is recognized that it is likely to be difficult to form slanting-edge apertures in a polymer material because a polymer material lacks the ductility of a material like stainless steel. Moreover, it is further recognized that a tapered mating tube can be utilized with both apertures having straight walls and apertures having slanting edges. Polyethylene and polypropylene are the most common materials utilized to form diffuser bodies for diffuser assemblies. Both materials are typically softer than stainless steel and polyvinylchloride. Polyethylene and polypropylene are also less expensive to produce, produce less hazardous waste when manufactured, and have higher temperature tolerances and impact resistances than polyvinylchloride. It is further noted that it is very difficult to chemically bond either polyethylene or polypropylene to polyvinylchloride, thereby producing a need for a mechanical attachment in the manner of this invention.

Nonetheless, importantly, this discussion of materials is solely illustrative, and it should, by no means, be interpreted as limiting the scope of the invention. In alternative embodiments, the diffuser body and mating tube may, as just a few more examples, comprise special forms of polypropylene (e.g., talc-filled polypropylene or glass-fiber-filled polypropylene) or may even comprise polyvinylchloride or acrylonitrile butadiene styrene. The distribution conduit, moreover, may comprise, as even further examples, polypropylene, polyethylene, or acrylonitrile butadiene styrene. In each case, the hardnesses (i.e., durometers) of these various materials may be tailored to the particular application by selecting an appropriate plasticizer additive if so desired. In this manner, a polyvinylchloride mating tube may, for instance, be made to be softer than a polypropylene distribution conduit.

IV. Advantages

As stated at the outset, it is one goal of the present invention to provide a means of attaching diffuser assemblies to distribution conduits in an automated manner, using machines to a greater degree for this work than is available with prior art methods and apparatus. It is contemplated that such automation will allow fully assembled diffuser assemblies to be attached to sections of distribution conduit at a manufacturing facility and then shipped to the wastewater treatment site in this higher level of completion. At the wastewater treatment site, the installer may then forego the tedious and time consuming task of mounting the diffuser assemblies.

Figure 14:
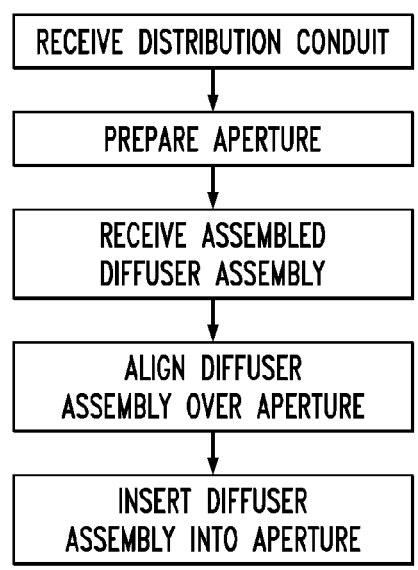
FIG. 14 shows a flow diagram of an exemplary method for mating a diffuser assembly with a distribution conduit in accordance with aspects of the invention.

Advantageously, both embodiments described above lend themselves to such automation. The fully assembled diffuser assemblies 300, 400, for example, are purposefully designed with lowermost points (i.e., the bottom of the posts 355 in the diffuser assembly 300, and the bottom edge of the anti-torque projection 450 in the diffuser assembly 400) that define a single plane. This facilitates the stacking of these assemblies in a vertical tube so that they may be supplied to a machine, at least in part, by gravity feed. The diffuser assemblies 300, 400 also lend themselves to the addition of one or more alignment features, one of which is visible in FIG. 9 (alignment feature 460). These alignment features facilitate the aligning of the diffuser assemblies 300, 400 to the proper orientation relative to their distribution conduits 305, 405 prior to insertion. With these features, one or more machines might perform the following steps to fully mate a diffuser assembly (300 or 400) to a distribution conduit (305 or 405): 1) receive a distribution conduit (305 or 405); 2) prepare an aperture (330 or 445) in the distribution conduit (305 or 405); 3) receive an assembled diffuser assembly (300 or 400); 4) align the assembled diffuser assembly (300 or 400) over the aperture (330 or 445) with the correct orientation; and 5) insert (i.e., press) the diffuser assembly (300 or 400) into the aperture (330 or 445). Such steps are shown in the flow diagram in FIG. 14. It is recognized that the design and implementation of such machines will be well within the skill of one of ordinary skill in the automation arts. Once in the field, the diffuser assemblies 300, 400 and the distribution conduits 305, 405 can be installed, used, and maintained in a largely conventional manner.

It should again be emphasized that the above-described embodiments of the invention are intended to be illustrative only. Other embodiments can use different steps as well as different types and arrangements of elements to implement the described functionality. As just one example, aspects of the invention can be readily adapted for the mounting of tube-type diffuser assemblies, as opposed to disc-type diffuser assemblies, to distribution conduits. As another example, the mating tubes of the diffuser assemblies and the apertures in the distribution conduits need not be round, but could, instead, be square or any other suitable shape. Accordingly, the term "diameter" as used herein is intended to indicate the length of a straight line through the center of an object and is not limited to describing objects that are necessarily circular or cylindrical. These numerous alternative embodiments within the scope of the appended claims will be apparent to one skilled in the art.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. An apparatus for treating wastewater, the apparatus comprising:
    a distribution conduit, the distribution conduit comprising an aperture having an initial minimum inside diameter; and
    a diffuser assembly, the diffuser assembly comprising a diffuser membrane in fluidic communication with a mating tube, the mating tube having an initial outside diameter at a location along its length greater than the initial minimum inside diameter of the aperture;
    wherein inserting the mating tube into the aperture until the location on the mating tube that, before insertion, had the initial outside diameter is encircled by the aperture where the aperture, before insertion, had the initial minimum inside diameter forms an airtight interference fit between the distribution conduit and the diffuser assembly.

2. The apparatus of claim 1, wherein the diffuser assembly further comprises an anti-torque projection, the anti-torque projection projecting from a surface of the diffuser assembly and defining a peripheral edge, one or more portions of the peripheral edge substantially conforming to an outside contour of the distribution conduit.

3. The apparatus of claim 2, wherein the diffuser assembly comprises a second anti-torque projection separate from the anti-torque projection, the second anti-torque projection substantially forming a mirror-image of the anti-torque projection.

4. The apparatus of claim 3, wherein the anti-torque projection and the second anti-torque projection are arranged on opposite sides of the mating tube.

5. The apparatus of claim 2, wherein the anti-torque projection encircles the mating tube.

6. The apparatus of claim 2, wherein the peripheral edge of the anti-torque projection comprises portions substantially conforming to outside contours of a plurality of distribution conduits with differing outside contours.

7. The apparatus of claim 2, wherein the peripheral edge describes at least two square corners and at least one arc.

8. The apparatus of claim 1, wherein the distribution conduit comprises a substantially circular or a substantially elliptical cylinder.

9. The apparatus of claim 1, wherein the distribution conduit comprises a substantially square or a substantially rectangular tube.

10. The apparatus of claim 1, wherein the distribution conduit is formed of a material that is harder than the material forming the mating tube.

11. The apparatus of claim 1, wherein the distribution conduit comprises a steel and the mating tube comprises a polymer.

12. The apparatus of claim 11, wherein the polymer comprises polypropylene or polyethylene.

13. The apparatus of claim 1, wherein the distribution conduit comprises polyvinylchloride and the mating tube comprises polypropylene or polyethylene.

14. The apparatus of claim 1, wherein the distribution conduit comprises at least one of steel, polyvinylchloride, polypropylene, polyethylene, and acrylonitrile butadiene styrene.

15. The apparatus of claim 1, wherein the mating tube comprises at least one of polyethylene, polypropylene, polyvinylchloride, and acrylonitrile butadiene styrene.

16. The apparatus of claim 1, wherein the aperture comprises an inwardly slanting edge.

17. The apparatus of claim 16, wherein the inwardly slanting edge extends more than a wall thickness of the distribution conduit.

18. The apparatus of claim 16, wherein the initial minimum inside diameter of the aperture is located proximate to a distal end of the inwardly slanting edge.

19. The apparatus of claim 1, wherein the mating tube terminates in a distal portion having a smaller outside diameter than a remainder of the mating tube.

20. The apparatus of claim 1, wherein the mating tube describes two substantially straight-walled cylindrical portions connected by a substantially tapered-wall cylindrical portion.

21. A method for treating wastewater, the method comprising the steps of:
    providing a distribution conduit;
    creating an aperture in the distribution conduit, the aperture having an initial minimum inside diameter;
    providing a diffuser assembly, the diffuser assembly comprising a diffuser membrane in fluidic communication with a mating tube, the mating tube having an initial outside diameter at a location along its length greater than the initial minimum inside diameter of the aperture; and
    inserting the mating tube into the aperture until the location on the mating tube that, before insertion, had the initial outside diameter is encircled by the aperture where the aperture, before insertion, had the initial minimum inside diameter so as to form an airtight interference fit between the distribution conduit and the diffuser assembly.

22. The method of claim 21, further comprising the steps of:
    immersing the diffuser assembly in the wastewater; and
    providing a gas to the diffuser assembly via the distribution conduit so that the gas passes through the diffuser membrane into the wastewater.

23. The method of claim 21, wherein the diffuser assembly further comprises an anti-torque projection, the anti-torque projection projecting from a surface of the diffuser assembly and defining a peripheral edge, one or more portions of the peripheral edge substantially conforming to an outside contour of the distribution conduit.

24. The method of claim 23, wherein the inserting step comprises inserting the mating tube into the aperture so that the one or more portions of the peripheral edge substantially conforming to the outside contour of the distribution conduit contact the distribution conduit.

25. The method of claim 23, wherein the anti-torque projection restricts the inserted diffuser assembly from twisting relative to the distribution conduit.

\* \* \* \* \*